United States Patent
Phogat et al.

(10) Patent No.: US 12,086,911 B2
(45) Date of Patent: Sep. 10, 2024

(54) NONLINEAR REPRESENTATIONS FOR VECTOR OBJECTS

(71) Applicant: Adobe Inc., San Jose, CA (US)

(72) Inventors: Ankit Phogat, Dadri (IN); Vishwas Jain, Bengaluru (IN); Vineet Batra, Pitam Pura (IN); Souymodip Chakraborty, Bengaluru (IN); Kevin John Wampler, Seattle, WA (US)

(73) Assignee: Adobe Inc., San Jose, CA (US)

( * ) Notice: Subject to any disclaimer, the term of this patent is extended or adjusted under 35 U.S.C. 154(b) by 116 days.

(21) Appl. No.: 17/960,582

(22) Filed: Oct. 5, 2022

(65) Prior Publication Data
US 2024/0135607 A1    Apr. 25, 2024

(51) Int. Cl.
G06T 11/20    (2006.01)
G06F 3/04845    (2022.01)
G06T 11/60    (2006.01)

(52) U.S. Cl.
CPC ........ *G06T 11/206* (2013.01); *G06F 3/04845* (2013.01); *G06T 11/60* (2013.01)

(58) Field of Classification Search
None
See application file for complete search history.

(56) References Cited

U.S. PATENT DOCUMENTS 6,128,001 A * 10/2000 Gonsalves ............ G06T 11/001
  345/589
2019/0197771 A1* 6/2019 Batra ...................... G06T 11/00

OTHER PUBLICATIONS

Asente, Paul, et al., "Dynamic Planar Map Illustration", ACM Transactions on Graphics, vol. 26, No. 3 [retrieved Aug. 26, 2022]. Retrieved from the Internet <https://doi.org/10.1145/1276377.1276415>., Jul. 29, 2007, 10 pages.
Warnock, John, et al., "A device independent graphics imaging model for use with raster devices", ACM SIGGRAPH Computer Graphics, vol. 16, No. 3 [retrieved Jul. 5, 2022]. Retrieved from the Internet <https://www.tech-insider.org/software/research/acrobat/8207.pdf>., Jul. 1, 1982, 7 Pages.

* cited by examiner

*Primary Examiner* — Robert J Craddock
(74) *Attorney, Agent, or Firm* — FIG. 1 Patents

(57) ABSTRACT

Techniques for nonlinear representations for vector objects are described that support construction of a nonlinear vector graph to represent a vector object. In an implementation, a user input is received including a plurality of points and at least one primitive. A content processing system then generates a vector object by constructing a nonlinear vector graph that specifies a nonlinear connection of the plurality of points with the at least one primitive. In some examples, the vector object is edited by applying an edit to the nonlinear vector graph. Once generated, the content processing system then outputs the vector object for display, e.g., in a user interface.

20 Claims, 13 Drawing Sheets

```
 1  "vector_path": {
 2      "id": 0,
 3      "geometry": [...],
 4      "appearance": [...]
 5  }
 6  "geometry": {
 7      "points": {
 8          "p0" : [0, -10], "p1": [10, 10], "p2" : [6, 10], "p3" : [-6,
             10], "p4" : [-10, 10], "p5" : [0, 20], "p6" : [-10, 18], "p
             7" : [-7, 18], "p8" : [-6, 18], "p9" : [-3, 18], "p10" : [
             0, 18], "p11" : [7, 18], "p12" : [6, 18], "p13" : [3, 18],
             "p14": [-7.5, 10], "p15":[0, 8.17], "p16":[7.5, 10]
 9      },
10      "lines" : {
11          "l0" : ["p0", "p1"],
12          "l1" : ["p0", "p2"],
13          "l2" : ["p0", "p3"],
14          "l3" : ["p0", "p4"]
15      },
16      "beziers3" : {
17          "b0" : ["p4", "p6", "p7", "p5"],
18          "b1" : ["p3", "p8", "p9", "p5"],
19          "b2" : ["p2", "p13", "p13", "p5"],
20          "b3" : ["p1", "p10", "p11", "p5"]
21      },
22      "circular_arcs" : {
23          "a0" : ["p4", "p3", "p14", 1],
24          "a1" : ["p3", "p2", "p15", 1],
25          "a2" : ["p2", "p1", "p16", 1]
26      },
27      "contours" : {
28          "c0" : ["l0", "a0", "l1"],
29          "c1" : ["l1", "a1", "l2"],
30          "c2" : ["l2", "a0", "l3"],
31          "c3" : ["a0", "b1", "b0"],
32          "c4" : ["a1", "b1", "b2"],
33          "c5" : ["a2", "b1", "b3"],
34          "c6" : ["l3", "b0", "b3", "l0"]
35      }
36  }
```

*Fig. 3b*

Fig. 5b

NONLINEAR REPRESENTATIONS FOR VECTOR OBJECTS

BACKGROUND

Vector objects are used to create a wide range of digital content due to the flexibility and accuracy in portraying the objects when rendered for display by a display device. Vector objects are mathematically generated using paths traditionally defined by start and end points, rather than as a collection of pixels. This enables vector objects to be scaled and modified by a computing device without a loss in visual quality. As such, vector objects are employed for a variety of graphic design purposes. However, paths used to implement conventional vector objects are defined as a linear representation of connected segments, where the connectivity and order of path segments is implicit. Accordingly, shape geometries in conventional representations of vector objects are approximated using a straight line or a cubic Bezier, which leads to inaccuracies when rendering or editing vector objects involving complex geometries.

SUMMARY

Techniques for nonlinear representations of vector objects are described that support construction of a nonlinear vector graph to represent a vector object. In an example, a computing device implements a content processing system to receive an input via a user interface. The input defines a plurality of points and at least one primitive. The content processing system then generates a vector object by constructing a nonlinear vector graph that specifies a connection of the plurality of points with the at least one primitive. The nonlinear vector graph supports a wide variety of primitives, and thus is able to accurately represent vector objects with complex geometries including representing one or more junctions in ways that are not possible in conventional techniques. Once generated, the content processing system outputs the vector object for display in the user interface.

The content processing system is further operable to generate an edited vector object by applying one or more edits to the nonlinear vector graph. For instance, edits are usable to affect properties of the vector object such as visual appearance, geometric properties, or interactivity and are made by applying edits to the nonlinear vector graph that represents the vector object. In one or more examples, this includes changing the structure of the nonlinear vector graph, changing characteristics and/or locations of the points/primitives, or adding/removing points/primitives. Because the vector graph is nonlinear, such edits are implemented to the nonlinear vector graph without a holistic reordering of the representation, which increases user and computational efficiency over conventional techniques and representations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3b depicts an example of a JavaScript Object Notation (JSON) representation of the nonlinear vector graph of FIG. 3a.

FIG. 5b depicts an example of a JSON representation of an addition edit depicted in FIG. 5a.

DETAILED DESCRIPTION

Overview

Figure 1:
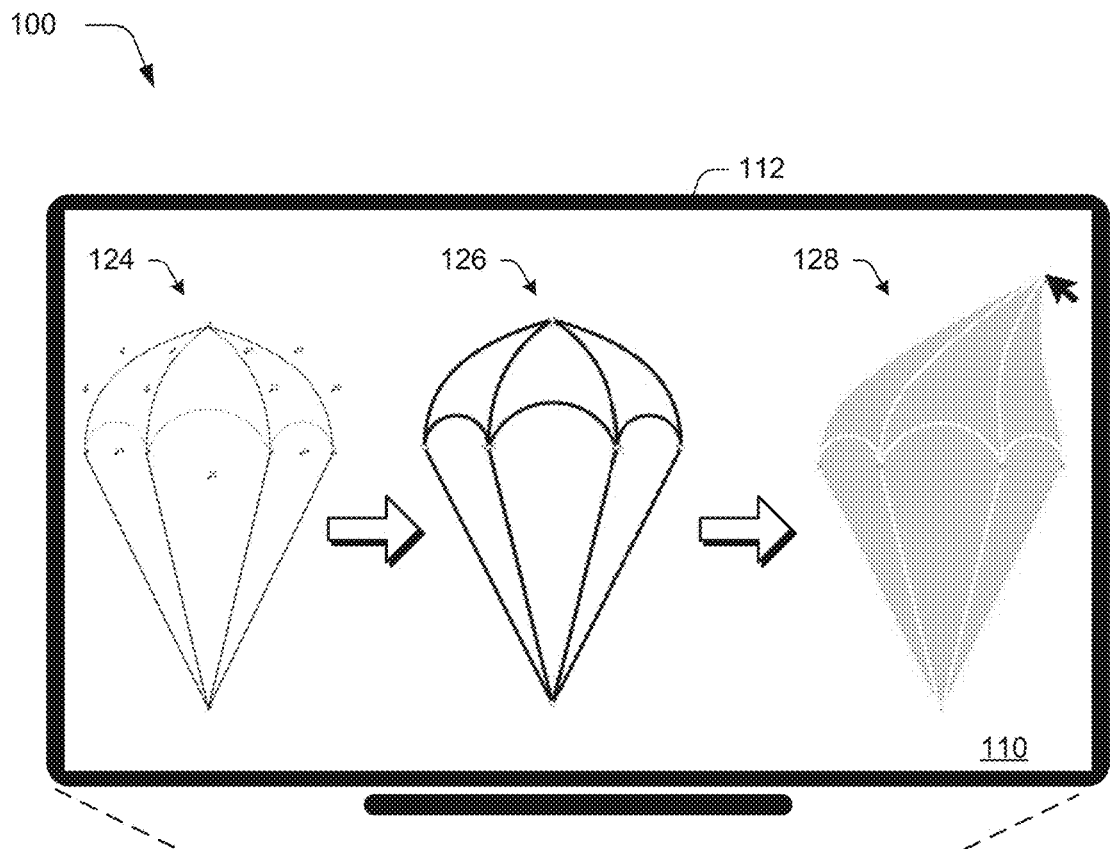
FIG. 1 is an illustration of a digital medium environment in an example implementation that is operable to employ the nonlinear representations for vector objects techniques described herein.
Figure 1:
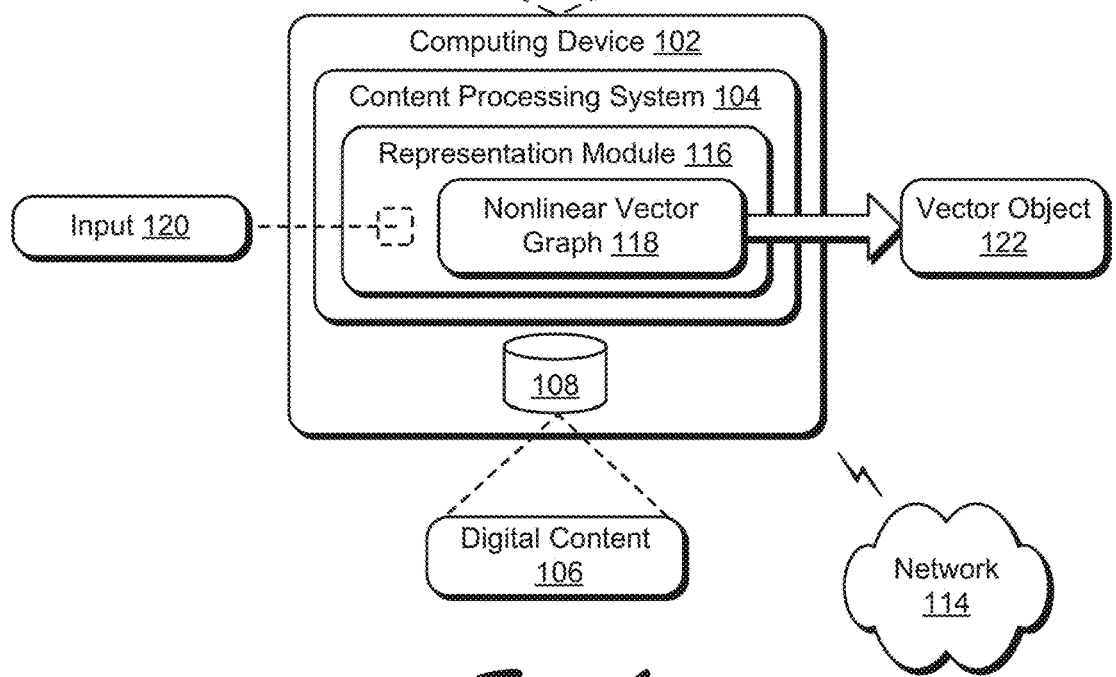

Vector objects provide an effective technique to depict visual information as being resolution independent and scalable without a loss in visual quality as compared to other types of object representations, e.g., raster objects. Vector objects are commonly used in graphic design workflows. Conventional modalities for representing vector objects, such as PDF (portable document format) or SVG (scalable vector graphics), rely on linear representations including paths that are defined as a linear sequence of segments, and accordingly the order of path segments is implicit. For instance, a pair of segments is connected through consecutive definition, e.g., a second segment begins at a point that a first segment ends.

However, conventional linear representations for vector objects are inherently incapable of representing junctions, e.g., involving three or more segments joined at a point. Thus, in conventional scenarios multiple paths are created to implement such geometries, which leads to difficulties in designing and editing vector objects. This also leads to a propensity for unwanted artifacts such as transparency blending, which reduces the visual quality of vector objects represented using conventional techniques and thus hinders device operation. Further, changes to conventional linear representations, such as adding or removing path segments or points, results in a holistic reordering of the linear sequence, which is computationally inefficient and prohibitive for collaborative editing workflows.

Additionally, conventional representations for vector objects are limited to approximating geometries using straight lines or cubic Béziers. Accordingly, conventional representations for vector objects are prone to inaccuracies associated with such approximations. By way of example, in conventional techniques a circle is approximated using four cubic Bézier curves. Imprecisions based on this approximation are evident when the vector object is manipulated in real-world scenarios. For instance, rotation of the circle results in inadvertent changes to the height and width of the circle. Thus, conventional representations for vector object are susceptible to visual inconsistencies when rendering or editing vector objects.

Accordingly, techniques for nonlinear representations for vector objects are described that overcome conventional challenges and improve user and computational efficiency by constructing a nonlinear vector graph to represent a vector object. Rather than define a path as a linear sequence of segments, as in conventional approaches, a path is represented by a nonlinear vector graph based on a set of points and one or more primitives that define a connectivity of the points and topology for the nonlinear vector graph. The nonlinear vector graph leverages an extensive set of primitives, and in addition to line primitives and cubic Bézier primitives, the techniques described herein introduce a variety of other primitives such as circular arc primitives, conic primitives, circular primitives, clothoid primitives, etc. The set of primitives is open ended and extensible, and the nonlinear vector graph is configured to incorporate additional types of primitives. In this way, the nonlinear vector graph accurately represents a variety of geometries without the approximation inaccuracies associated with conventional techniques.

In an example, a computing device implements a representation module to receive an input including a plurality of points and at least one primitive, e.g., as a user input to illustrate a vector object in a user interface. The representation module is operable to generate the vector object by constructing a nonlinear vector graph that specifies a nonlinear connection of the plurality of points with the at least one primitive. Whereas conventional representations for vector objects are defined as a linear sequence of segments, the representation module explicitly indexes the points and the at least one primitive to construct the vector graph in a nonlinear manner, e.g., by associating the points and at least one primitive with a respective identifier. In this way, the nonlinear vector graph is able to represent junctions and increase computational and user efficiency in graphic design workflows, for instance when applying edits to the vector object.

In various examples, the nonlinear vector graph includes more than one primitive. To arrange the primitives, the nonlinear vector graph further includes one or more contours, which represent a non-intersecting connected ordering to the primitives. Thus, rather than rely on a linear connection of segments as involved in conventional techniques, the ordering, interaction, and modification of the nonlinear vector graph is controllable by the one or more contours. The representation module is operable to utilize the contours to create faces and edges of a vector object, as well as modify their features such as shape, position, fill, stroke properties, etc.

The representation module is also operable to directly implement one or more constraints as part of the nonlinear vector graph that define a relationship between two or more primitives. Conventional representations for vector objects are unable to incorporate constraints into the representation itself, and thus visual edits to mimic constraints are added using design tools post-hoc, which is computationally inefficient and time-consuming for users. Through use of the nonlinear vector graph, however, constraints are integrated directly into the representation, e.g., as "first class citizens" of the representation as opposed to an "ad hoc" conventional technique.

In an example, a continuity constraint defined over a pair of primitives is implemented to ensure that a particular curve remains smooth during editing operations. In another example, a concentric constraint for two circular arc primitives enforces use of a same center by two primitives. Accordingly, the relationship between the circular arc primitives as defined by the constraint is maintained as part of the nonlinear vector graph, even throughout subsequent editing operations. In this way, the nonlinear vector graph facilitates computational and user efficiency by natively representing constraints as part of the representation.

The representation module is further operable to edit a vector object by applying an edit to a corresponding nonlinear vector graph that defines the vector object. For instance, edits are applied to the nonlinear vector graph such as one or more of editing a structure of the nonlinear vector graph, changing a characteristic of at least one primitive, and/or altering a location of one or more points of the plurality of points. In alternative or additional examples, applying the edit to the nonlinear vector graph includes adding a point to a primitive, adding a primitive to the nonlinear vector graph, deleting a point from the nonlinear vector graph, and/or deleting a primitive from the nonlinear vector graph. Accordingly, the representation module is operable to edit a variety of properties of the vector object such as visual appearance, editability, interactivity, etc. by applying edits to the nonlinear vector graph.

In some examples, the representation module is employed to join a first nonlinear vector graph with a second nonlinear vector graph. For instance, the points and primitives of the first nonlinear vector graph are merged with the points and primitives of the second nonlinear vector graph. In other examples, the representation module is operable to split the nonlinear vector graph into two or more resulting nonlinear vector graphs. Because the points and primitives of the nonlinear vector graph are explicitly indexed, e.g., associated with a respective identifier, such edits are made without necessitating a holistic reordering to the representation thus increasing user and computational efficiency over conventional techniques and representations.

Further, implementation of contours as part of the nonlinear vector graph to define edges and/or faces of a vector object supports enhanced functionality related to application of visual edits to the vector object, for instance supporting multiple fill and/or stroke operations in different regions of the vector object. By way of example, the nonlinear vector graph includes at least one contour defining an edge of the vector object and applying the edit to the nonlinear vector graph includes applying a visual effect to the edge as a stroke operation, e.g., to change the color, size, style, etc. of the edge.

In another example, the nonlinear vector graph includes at least one contour defining a face of the vector object and applying the edit to the nonlinear vector graph includes a fill operation to apply a visual effect to pixels of the face, e.g., to control the color, size, style, etc. of the face. Further, consider an example in which the vector object includes several contours that intersect. The representation module is operable to compute a planar arrangement to generate non-overlapping faces in support of individualized edits to the faces. By leveraging the contours, multiple colors are applicable to faces on the same path. Thus, the computation of the planar arrangement eliminates the conventional requirement to create separate paths to color different regions of the vector object. Accordingly, the techniques described herein increase user and computational functionality over conventional techniques and representations in a variety of ways, further discussion of which is included in the following sections.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the nonlinear representations for vector objects techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 11.

The computing device 102 is illustrated as including a content processing system 104. The content processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud."

An example of functionality incorporated by the content processing system 104 to process the digital content 106 is illustrated as a representation module 116. The representation module 116 is configured in the illustrated example to construct a nonlinear vector graph 118 from an input 120 to generate one or more vector objects 122. Functionality of the representation module 116 is shown in the illustrated example in a first stage 124, a second stage 126, and a third stage 128.

At the first stage 124, the representation module 116 receives input 120, for instance, a user input to draw a vector object in the user interface 110. The input 120 is representable as a plurality of points and at least one primitive. From the input 120, the representation module 116 is operable to construct the nonlinear vector graph 118. The nonlinear vector graph 118 specifies a nonlinear connection of the plurality of points by the at least one primitive.

The second stage 126 illustrates the vector object 122 as generated by the representation module 116 based on the nonlinear vector graph 118. In this example, the primitives include line primitives, cubic Bézier primitives, and circular arc primitives. Conventional representations are limited to approximating vector objects using straight lines or cubic Béziers, and thus support of an expanded variety of primitives by the representation module 116 overcomes conventional limitations to accurately depict geometry particular to the vector object 122. For instance, the three central circular arcs primitives accurately depict the arc shapes with a fixed radius and are not subject to inaccuracies associated with approximation of the arc shapes to a cubic Bézier.

The third stage 128 illustrates an edited vector object. For instance, the representation module 116 receives an input 120 specifying one or more edits to the vector object 122. In this example, the edit includes a stroke operation, e.g., to change the color of a path of the vector object 122 from black to white, as well as a fill operation, e.g., to color pixels of faces of the vector object 122. The edits also include a change to the topology of the vector object 122, e.g., an operation to "drag" the top of the vector object 122 to alter its shape.

The edits are implemented by applying the edit to the nonlinear vector graph 118, e.g., applying the stroke operation to edges defined by the nonlinear vector graph 118, applying the fill operation to faces defined by the nonlinear vector graph 118, editing a structure of the nonlinear vector graph, changing a characteristic of at least one primitive, and/or altering a location of one or more points of the plurality of points. Because the nonlinear vector graph 118 relies on explicit indexing rather than a linear ordering for path segments, the edits are incorporated without a reordering to the representation. As a result, the representation module 116 increases user and computational efficiency over conventional techniques and representations, further discussion of which is included in the following sections.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Nonlinear Vector Graph Representation

Figure 2:
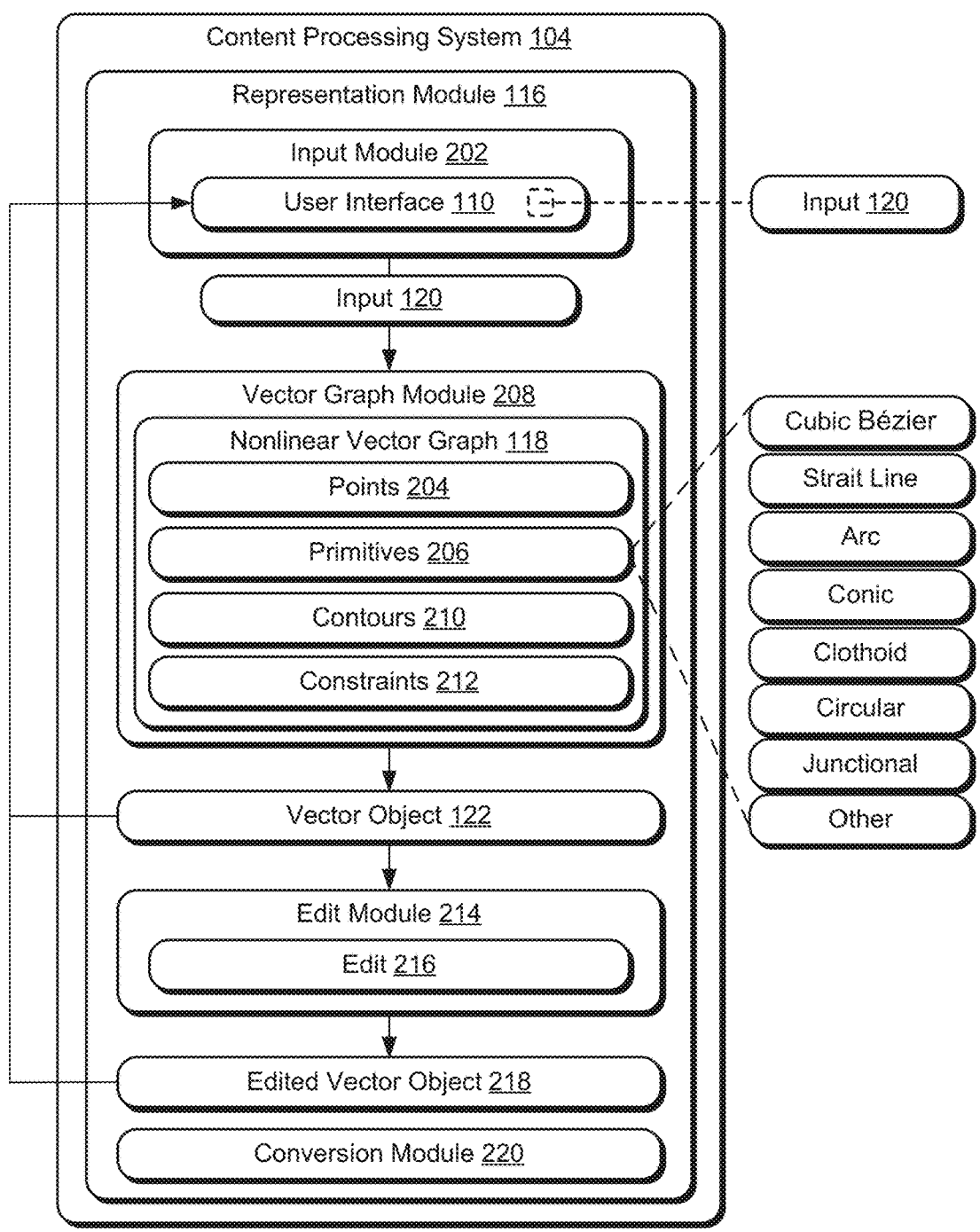
FIG. 2 depicts a system in an example implementation showing operation of representation module of FIG. 1 in greater detail.
Figure 3A:
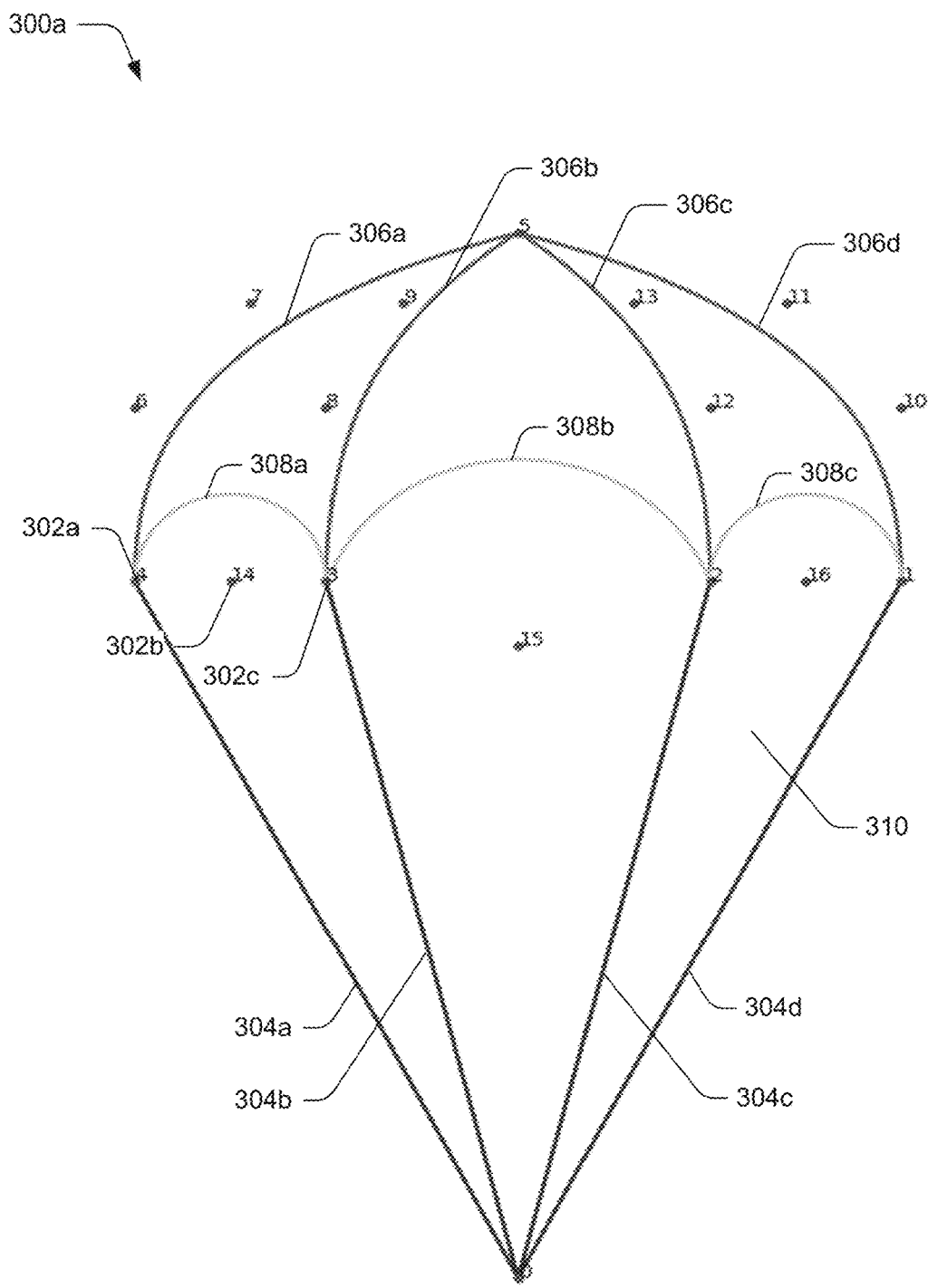
FIG. 3a depicts an example of a geometric realization of a nonlinear vector graph.
Figure 4:
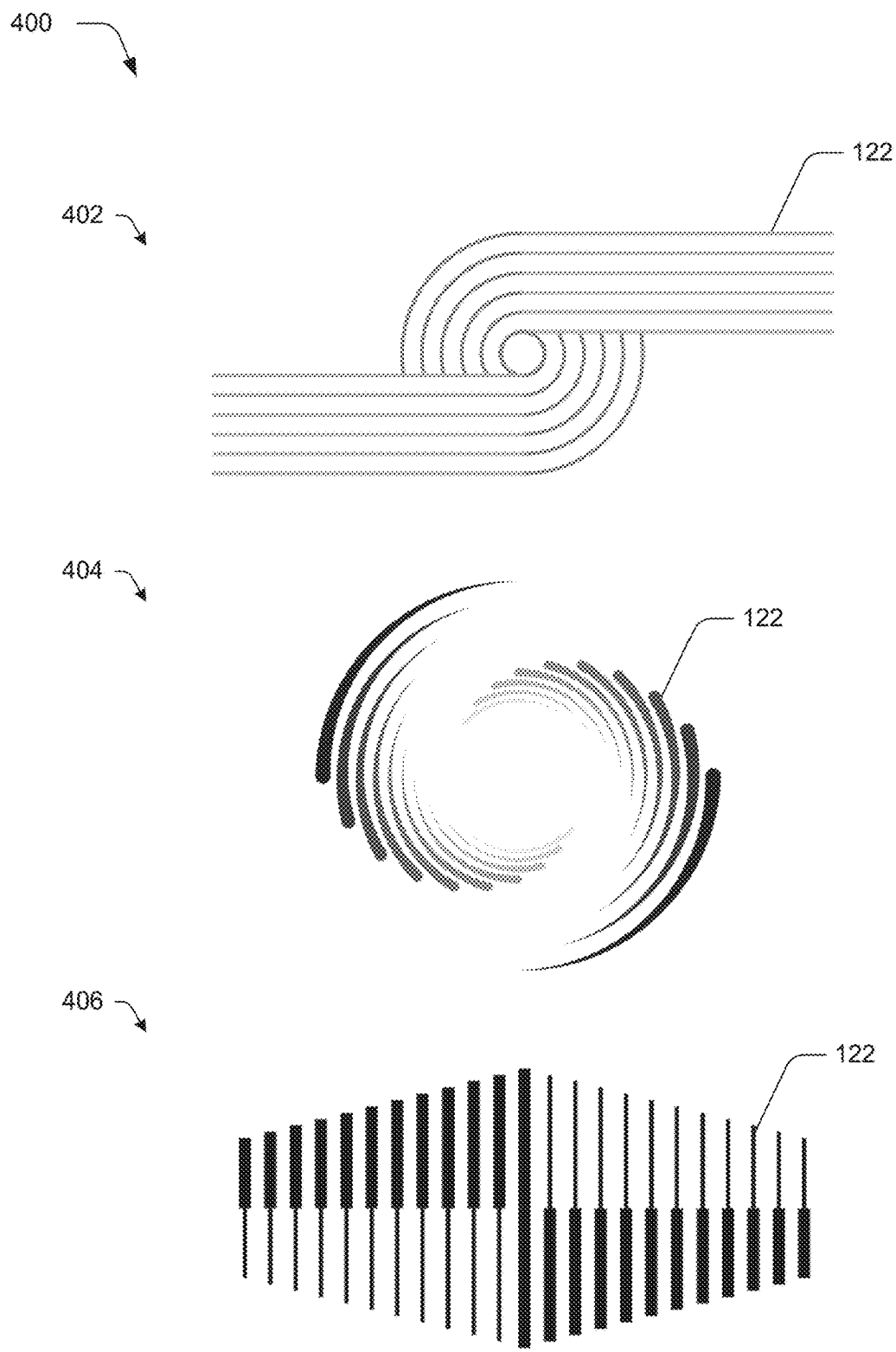
FIG. 4 is an example illustration depicting first, second, and third examples of various constraints includable in nonlinear vector graphs.
Figure 5A:
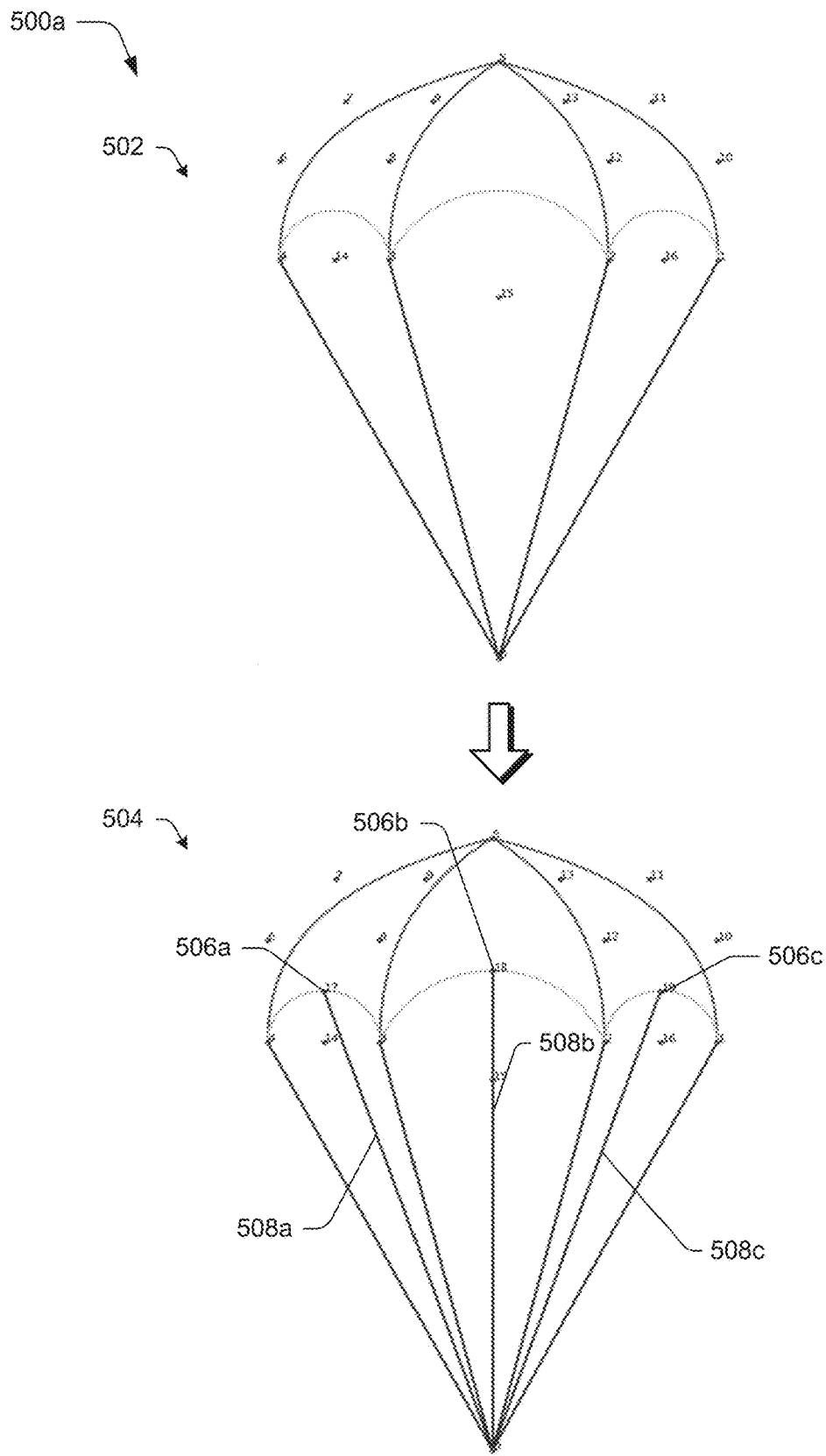
FIG. 5a depicts an example of an edit to add points and primitives to a nonlinear vector graph.
Figure 6:
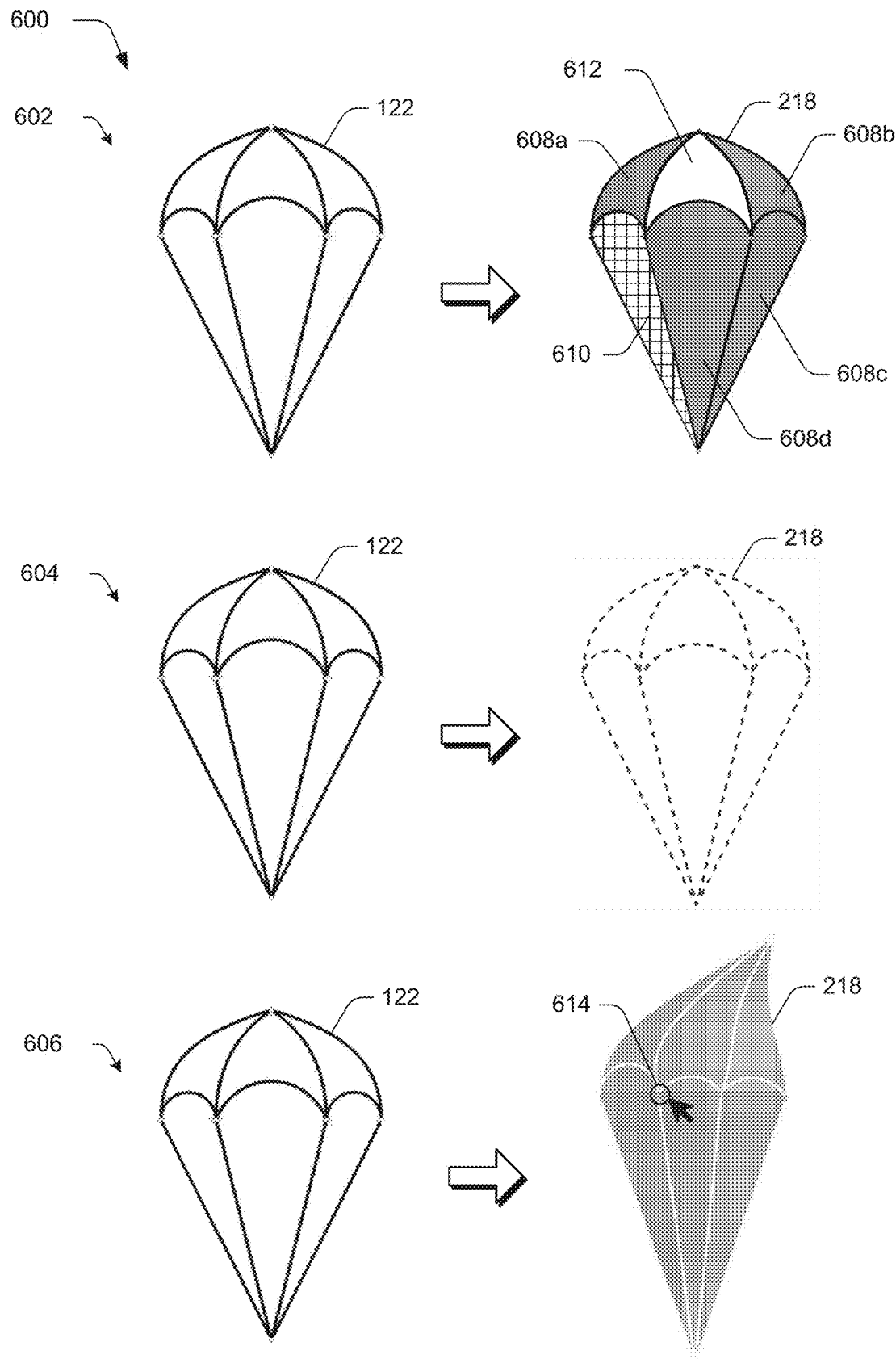
FIG. 6 is an example illustration depicting first, second, and third examples of applying an edit to a nonlinear vector graph to generate an edited vector object.
Figure 7:
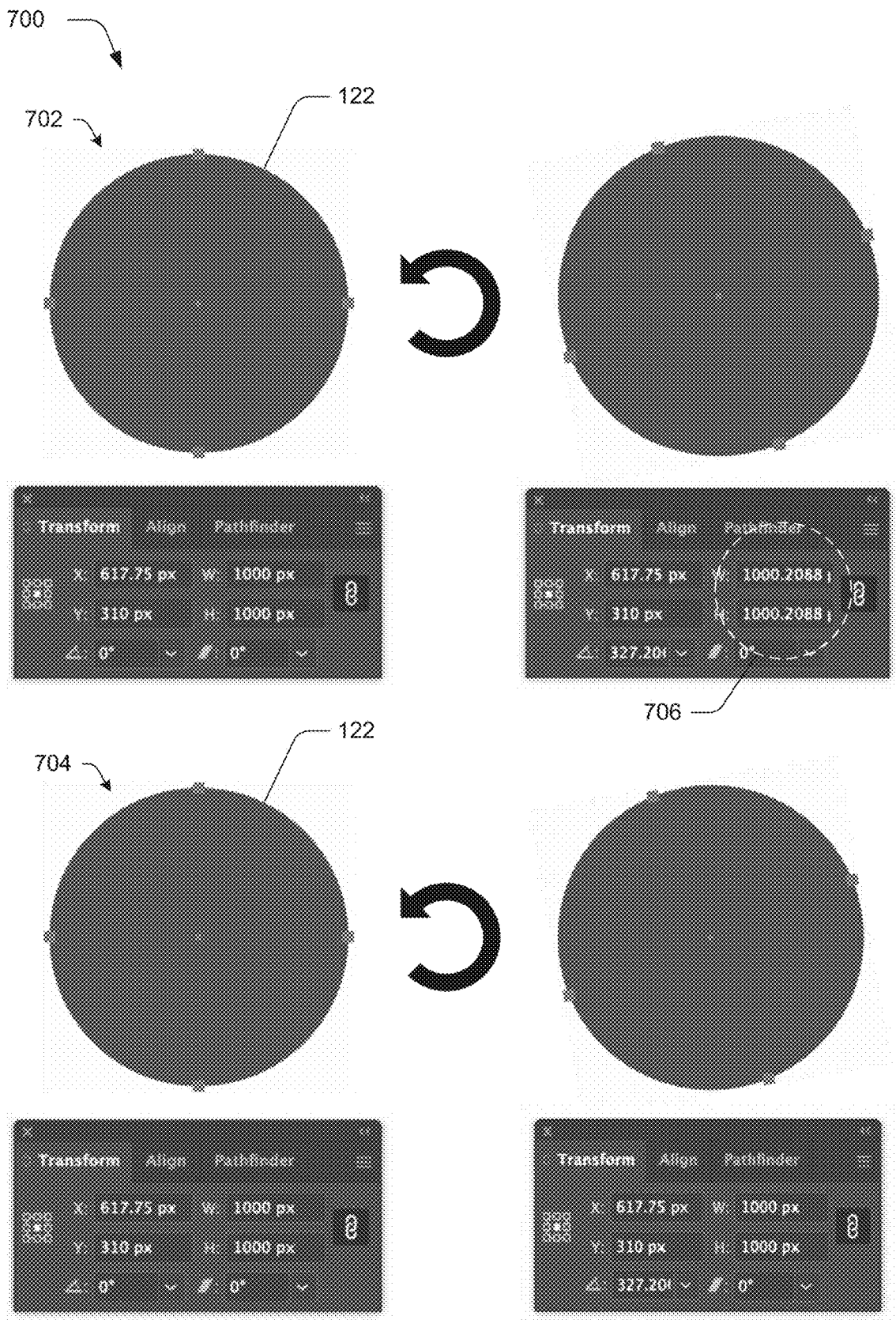
FIG. 7 depicts an example of a practical application of the techniques described herein compared to conventional representations for vector objects in first and second examples.
Figure 8:
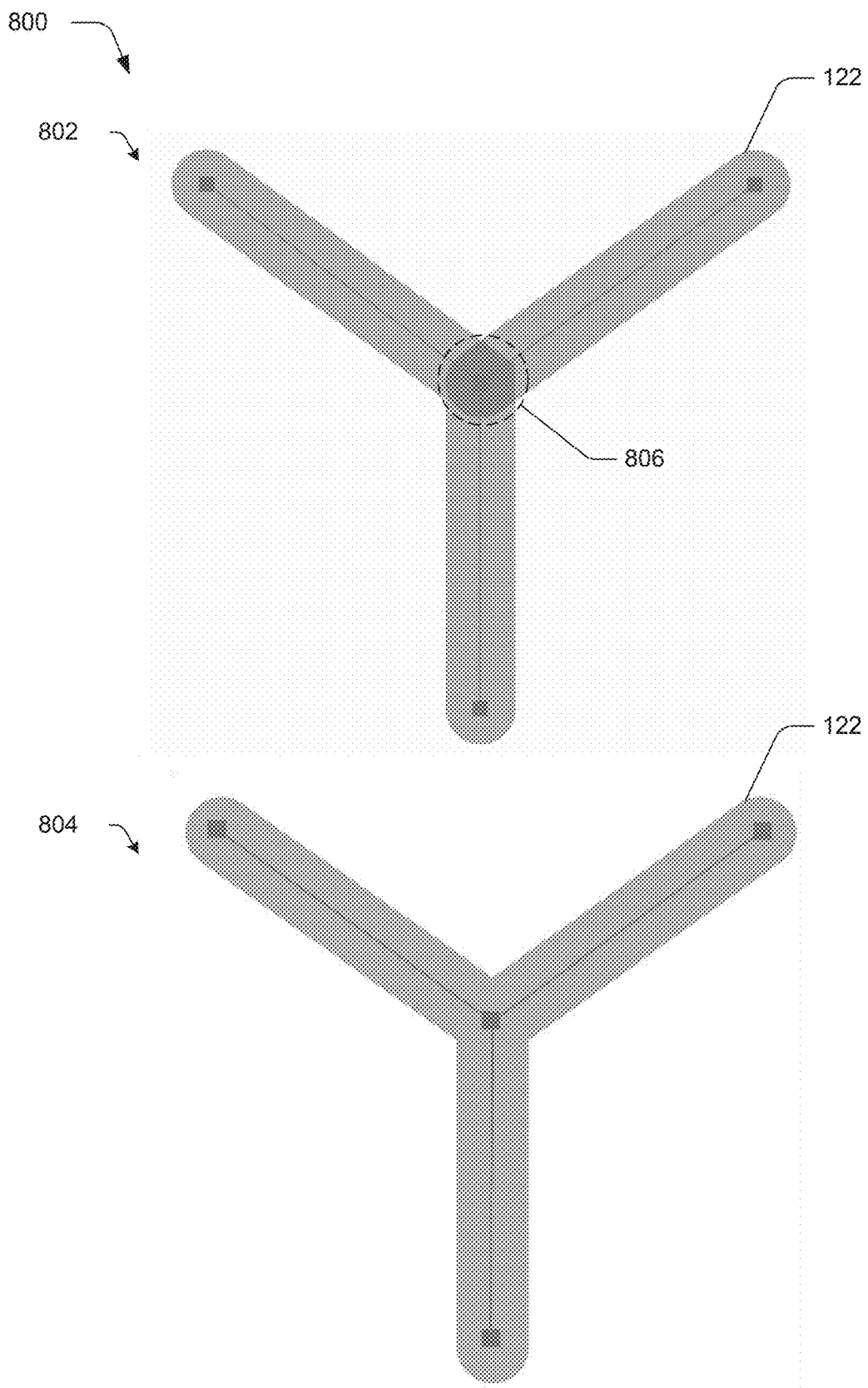
FIG. 8 depicts an additional example of a practical application of the techniques described herein compared to conventional representations for vector objects in first and second examples.
Figure 9:
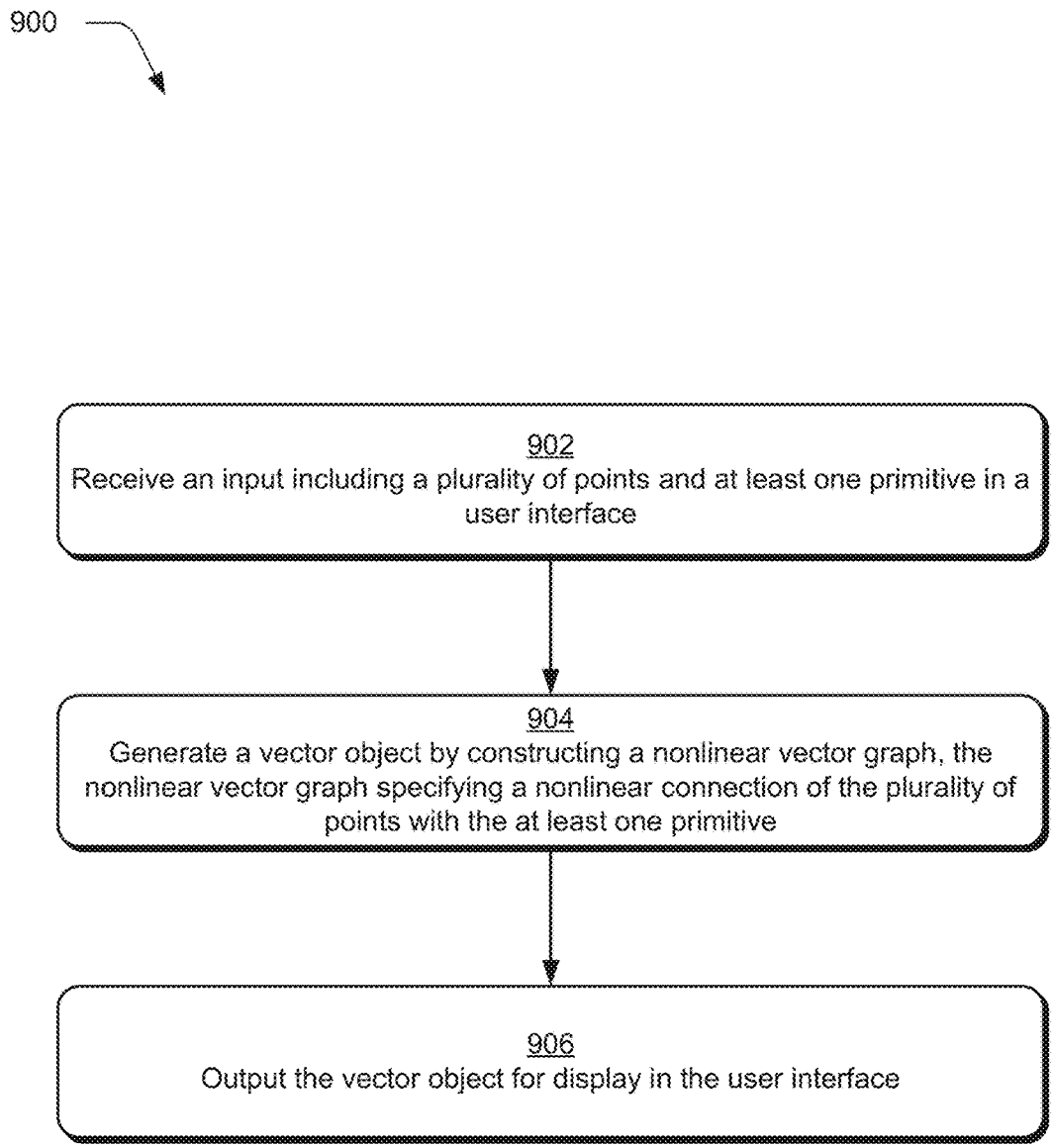
FIG. 9 depicts a procedure in an example implementation of nonlinear representations for vector objects.
Figure 10:
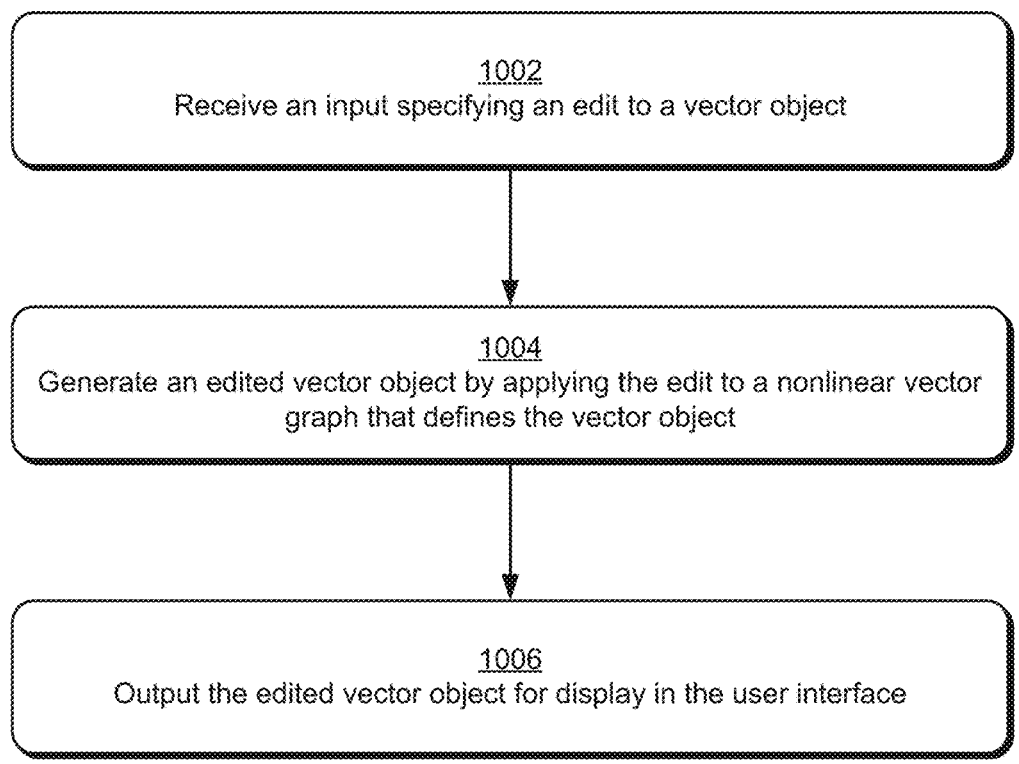
FIG. 10 depicts a procedure in an example implementation of nonlinear representations for vector objects including applying an edit to a nonlinear vector graph.

FIG. 2 depicts a system 200 in an example implementation showing operation of representation module 116 of FIG. 1 in greater detail. FIG. 3a depicts an example 300a of a geometric realization of a nonlinear vector graph. FIG. 3b depicts an example 300b of a JavaScript Object Notation (JSON) representation of the nonlinear vector graph of FIG. 3a. FIG. 4 is an example illustration 400 depicting first, second, and third examples 402, 404, and 406 of various constraints includable in nonlinear vector graphs. FIG. 5a depicts an example 500a of an edit to add points and primitives to a nonlinear vector graph. FIG. 5b depicts an example 500b of a JSON representation of an addition edit depicted in FIG. 5a. FIG. 6 is an example illustration 600 depicting first, second, and third examples 602, 604, and 606 of applying an edit to a nonlinear vector graph to generate an edited vector object. FIG. 7 depicts an example of a practical application of the techniques described herein compared to conventional representations for vector objects in first and second examples 702 and 704. FIG. 8 depicts an additional example 800 of a practical application of the techniques described herein compared to conventional representations for vector objects in first and second examples 802 and 804. FIG. 9 depicts a procedure 900 in an example implementation of nonlinear representations for vector objects. FIG. 10 depicts a procedure 1000 in an example implementation of nonlinear representations for vector objects including applying an edit to a nonlinear vector graph.

The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference will be made to FIGS. 1-10.

To begin in this example, an input module 202 receives an input 120 via the user interface 110. The input includes a plurality of points 204 and at least one primitive 206 (block 902). A variety of techniques are supported by the input module 202 to specify the input 120. In one example, the input 120 is received as a selection to perform an operation, e.g., a user selects an operation to depict an object in the user interface 110. The representation module 116 is configured to convert the selection to perform the operation into the plurality of points 204 and the at least one primitive 206, automatically and without user intervention. In additional or alternative examples, the input 120 is received in an alternative format representation, such as in a PDF/SVG format. The representation module 116 is employed to convert the alternative format representation into the plurality of points 204 and the at least one primitive 206 as further described below.

Based on the points 204 and the at least one primitive 206, a vector graph module 208 is employed to generate a vector object 122 by constructing a nonlinear vector graph 118 that specifies a nonlinear connection of the plurality of points 204 with the at least one primitive 206 (block 904). Whereas conventional representations are limited to constructing linear paths using straight lines or cubic Beziers, the representation module 116 leverages a variety of types of primitives 206 to accurately represent a wide range of vector object geometries. For instance, primitives 206 include but are not limited to line primitives, cubic Bezier primitives, circular arc primitives, conic primitives, circular primitives, clothoid primitives, junctional primitives, etc. Thus, the techniques described herein avoid approximation inaccuracies associated with conventional techniques as further described below with respect to FIG. 7.

Further, conventional representations for vector objects rely on vector paths that are defined as a linear sequence of segments. Thus, conventional methodologies are incapable of representing junctions, e.g., involving three or more segments joined at a point. Additionally, edits to conventional linear representations results in a reordering of the linear sequence, which is computationally inefficient and tedious for users. To overcome these limitations, the vector graph module 208 explicitly indexes the points 204 and the at least one primitive 206 to construct the nonlinear vector graph 118 as a nonlinear representation. For instance, the vector graph module 208 is operable to associate the points 204 and at least one primitive 206 with a respective identifier.

By way of example, consider a nonlinear vector graph 118 as illustrated in FIG. 3a, which is a geometric realization of a JSON (JavaScript Object Notation) representation for the nonlinear vector graph 118 illustrated in FIG. 3b. The nonlinear vector graph 118 represents the plurality of points 204, examples of which are labelled at 302a, 302b, and 302c. The nonlinear vector graph 118 also includes several types of primitives 206, such as line primitives, (e.g., 304a, 304b, 304c, and 304d), cubic Bézier primitives (e.g., 306a, 306b, 306c, and 306d), and circular arc primitives, e.g., 308a, 308b, and 308c.

As shown in FIG. 3b, the point 302a is associated with an identifier "p4" to label the point. The primitives 206 are also indexed. For instance, the circular arc primitive 308a is associated with an identifier "a0". The primitives 206 specify a connectivity for the plurality of points 204 using the identifiers for the points 204. For instance, as shown in the illustrated example 300b, the circular arc primitive illustrated at 308a is defined as "a0": ["p4", "p3", "p14", 1]. This specifies a circular arc "sweeping" from p4 to p3, with a center point p14. The "1" term indicates a directionality of the arc, i.e., "spin", and in this example indicates a counterclockwise sweep as further described below.

By way of further explanation, consider a symbolic representation for this example in which the nonlinear vector graph 118 is represented as $G := (\Omega, \mathcal{T})$ where $\Omega$ includes the plurality of points 204 in a Euclidean space $\mathbb{R}^n$. In this example n=2 is used to depict a planar representation, however higher dimensions are considered as well, e.g., n>2. $\mathcal{T}$ is a collection of the primitives 206 of the nonlinear vector graph 118, and thus $\mathcal{T}$ defines the connectivity of the points 204 of the nonlinear vector graph 118.

In the illustrated example 300a, the primitives 206 include several line primitives, e.g., illustrated at 304a, 304b, 304c, and 304d. The line primitives are defined as $L := \{(p,q)|p,q \in \Omega\}$ where the points defining a line l are points(l)={p, q}, control(l)=∅. The nonlinear vector graph 118 further includes the four cubic Bézier primitives, e.g., 306a, 306b, 306c, and 306d. In this example, the cubic Bézier primitives are a subset of $\Omega^4$ such that $\{(p_0, p_1, p_2, p_3) \in \Omega\}$. Thus, a cubic Bézier curve is defined by four points from a The points and controls of a Bézier b are defined as points(b)={$p_0, p_3$}, control(b)={$p_1, p_2$} respectively.

The nonlinear vector graph 118 in the example 300a further includes three circular arc primitives, e.g., illustrated as 308a, 308b, and 308c. The circular arc primitives are defined as $A := \Omega^3 \times \mathbb{B}$. A given arc a is defined by three control points from the plurality of points 204 and a spin value, such as a tuple ($p_0$, $p_1$, c, s). In this example, the sweep of the arc starts from $p_0$ and ends in $p_1$, c is the center of the arc, and s is the spin value for the arc that signifies a directionality of sweep for the circular arc primitive. In this example, a spin value=−1 signifies a clockwise sweep from $p_0$ to $p_1$. A spin value=+1 signifies a counterclockwise sweep from $p_0$ to $p_1$. The points and the controls of the arc a are defined as points(a)={$p_0$, $p_1$}, and control(a)={c}. The topology $\mathcal{T}$ is thus a collection of various primitives 206 such that $\mathcal{T} \subseteq L \cap A \cap B$. As noted above, this is by way of example and not limitation and a variety of primitives 206 are usable to represent complex geometries.

Continuing the above example, the points of the plurality of points 204 are mapped by a parameter $t \in [0,1]$. In this example, a mapping function for a primitive 206 denoted $\rho$ is a function $\rho: [0,1] \rightarrow \mathbb{R}^2$. The starting and ending points of the curve are defined by $\rho(0)$ and $\rho(1)$ respectively. Further, extrem($\rho$):={$\rho(0)$, $\rho(1)$}. The definitions of the primitives 206 are constructed such that for the nonlinear vector graph 118, i.e., $\mathcal{G} := (\Omega, \mathcal{T})$, for each $\rho \in \mathcal{T}$, extrem($\rho$)$\subseteq \Omega$. The primitives 206 are thereby not linearly connected, which overcomes the limitations of conventional representations as discussed above.

Rather, to arrange the primitives 206, the nonlinear vector graph 118 further includes one or more contours 210, which represent a non-intersecting connected ordering to the primitives 206. Thus, the ordering, interaction, and modification of the nonlinear vector graph 118 is controllable in part by the one or more contours 210. The vector graph module 208 is operable to utilize the contours 210 to create geometric features of a vector object 122 (e.g., faces and edges), as well as modify features of the contours 210 such as shape, position, fill, stroke properties, etc.

Continuing the above example, the contours 210 of the nonlinear vector graph 118, i.e., $\mathcal{G} := (\Omega, \mathcal{T})$, are defined as a non-intersecting connected sequence of primitives 206 $\{\rho_i\}_{1 \leq i \leq n}$ such that $\forall_{i \in [1, n-1]}$: $\|\text{extrem}(\rho_i) \cap \text{extrem}(\rho_{i+1})\| = 1$. In this example, $\mathcal{O}$ represents the set of contours 210 defined for $\mathcal{G}$. A contour 210 is considered closed where $\|\text{extrem}(\rho_1) \cap \text{extrem}(\rho_n)\| = 1$. A contour 210 is considered nonintersecting where $\forall_{i,j, |i-j|>1, \text{ and } i \neq 1, j \neq n}$: extrem($\rho_i$)$\cap$extrem($\rho_j$) = $\emptyset$ for the nonlinear vector graph 118, denoted $\mathcal{G}$.

In some implementations, the one or more contours 210 define one or more faces of the vector object 122. Closed contours 210 enclose a region of $\mathbb{R}^n$. A face is thus a minimal closed contour 210. In alternative or additional implementations, the one or more contours 210 define one or more edges of the vector object 122. In an example, an edge is a contour 210 of length 1.

For instance, in the illustrated example 300a, the nonlinear vector graph 118 includes seven contours. Consider a contour 210 denoted by the box at 310 in FIGS. 3a and 3b. The vector graph module 208 utilizes the indexed primitives 206 to define the contour, e.g., "c0": ["l0", "a2", "l1"]. That is, the contour "c0" represents a face defined by the "l0", "a2", and "l1" primitives 206. As further described below, an edit module 214 is operable to leverage these defined contours to efficiently modify features of the contours 210 such as shape, position, fill, stroke properties, etc.

The vector graph module 208 is also operable to directly implement one or more constraints 212 as part of the nonlinear vector graph 118 that further define a relationship between two or more points 204, primitives 206, and/or contours 210. Conventional representations for vector objects are unable to incorporate constraints 212 into the representation itself, and thus visual edits to mimic constraints 212 are added using design tools post-hoc, which is computationally inefficient and time-consuming. Through use of the nonlinear vector graph 118, however, constraints 212 are integrated directly into the representation, e.g., as "first class citizens" of the representation. That is, the constraints 212 are affirmatively defined as a native part of the nonlinear vector graph 118. A variety of constraints 212 are considered, for instance continuity constraints, parallel constraints, tangential constraints, concentric constraints, etc.

FIG. 4 depicts an example illustration 400 of various types of constraints applicable to vector objects 122 as shown in a first, a second, and a third example 402, 404, and 406. For instance, as shown in the first example 402, a vector object 122 includes several straight-line primitives, as well as several circular arc primitives. The vector graph module 208 is employed to incorporate several tangential constraints to the nonlinear vector graph 118 that represents the vector object 122. The vector graph module 208 integrates the tangential constraints into the nonlinear vector graph 118 to impose a condition that the line primitives remain tangent to the circular arc primitives. Accordingly, integration of the tangential constraints results in precise visual controls for the vector object 122 in the first example 402.

In the second example 404, the vector graph module 208 is employed to incorporate several concentric constraints to the nonlinear vector graph 118. A vector object 122 depicted in the second example 404 includes several circular arc primitives. The vector graph module 208 includes the concentric constraints with the nonlinear vector graph 118 representing the vector object 122 to enforce the circular arc primitives to have the same center, thus ensuring a concentric appearance for the vector object 122.

In the third example 406, the nonlinear vector graph 118 that represents a vector object 122 includes a set of straight-line primitives and a plurality of parallel constraints. The parallel constraints are defined on the set of line primitives included in the nonlinear vector graph 118 and ensure that the line primitives remain parallel. Because these constraints are represented natively as part of the nonlinear vector graph 118, the visual effects specified by the constraints 212 persist through editing and rendering operations. In this way, the nonlinear vector graph 118 facilitates computational and user efficiency by representing constraints as first-class citizens of the nonlinear vector graph 118.

Accordingly, the vector graph module 208 is operable to construct a nonlinear vector graph 118 using varied combinations of points 204, primitives 206, contours 210, and constraints 212. The vector object 122 is generated based on the nonlinear vector graph 118, and includes the features specified by the points 204, primitives 206, contours 210, and constraints 212. Once generated, the representation module 116 is employed to output the vector object 122 for display in the user interface 110 (block 906). In this way, the vector object 122 is adaptable to a variety of design scenarios, for instance generated in such a way to facilitate efficient and intuitive editing, as described in the following section.

Editing Operations Using the Nonlinear Vector Graph

The representation module 116 further includes an edit module 214 that is configured to receive an input specifying an edit 216 to a vector object (block 1002). For instance, the input includes a user input in the user interface 110 to apply an edit 216 including one or more visual edits to the vector object 122, e.g., to alter the color, size, shape, arrangement, orientation of a portion of the vector object 122 or the vector object 122 as a whole. Alternatively or additionally, the edit 216 is non-visual and changes a quality of the vector object 122 without affecting its visual appearance. For instance, the edit 216 specifies changes to the interactivity of the vector object 122, e.g., by joining or splitting the nonlinear vector graph 118, adding or removing points 204 such as anchors, handles, click points, etc. that impact how a user is able to interact with the vector object 122 in the user interface 110.

The edit module 214 is operable to generate an edited vector object 218 by applying the edit 216 to a nonlinear vector graph 118 that defines the vector object 122 (block 1004). In some examples, applying the edit 216 to the nonlinear vector graph 118 includes one or more of editing a structure of the nonlinear vector graph 118, changing a characteristic of at least one point 204 and/or primitive 206, and/or altering a location of one or more points of the plurality of points 204 and/or the at least one primitive 206. In additional or alternative examples, the edit 216 includes editing a characteristic or property of one or more contours 210 and/or one or more constraints 212. In this way, the edit module 214 is operable to apply edits 216 to the nonlinear vector graph 118 to alter the size, geometry, shape, arrangement, orientation, etc. of the vector object 122.

In alternative or additional examples, applying the edit 216 to the nonlinear vector graph 118 includes adding a point to a primitive 206 of the nonlinear vector graph 118, adding a primitive 206 to the nonlinear vector graph 118, deleting a point from the nonlinear vector graph 118, and/or deleting a primitive from the nonlinear vector graph 118. Consider an example in which the edit module 214 adds a point to an existing primitive 206 of the nonlinear vector graph 118. This example follows the symbolic convention defined above in which the nonlinear vector graph 118 is represented as $\mathcal{G} := (\Omega, \mathcal{T})$. In this example, addition of the point results in fragmentation of the existing primitive 206. Accordingly, to add a point at parameter value t of the primitive 206, dentoted "ρ", the first step is to add the point ρ(t) to Ω. The existing primitive 206 ρ is then removed from $\mathcal{T}$, and $\rho_l$ and $\rho_r$ and added to $\mathcal{T}$, such that $\rho_l \circ \rho_r = \rho$, where "∘" denotes concatenation of two primitives.

Control points associated with $\rho_l$ and $\rho_r$ are also added to Ω.

In an alternative or additional example, the edit 216 includes adding a primitive ρ to the nonlinear vector graph 118, for instance to change the visual appearance of the vector object 122 and/or to impact the interactivity of the vector object 122. To do so, the edit module 214 adds extrem(ρ) to Ω. Control points associated with ρ are also added to Ω. Subsequently, the edit module 214 adds ρ to $\mathcal{T}$. The edit module 214 is further operable to add intersection points of ρ and existing primitives $\tau' \in \mathcal{T}$ to ensure a planar geometry using the above-described techniques for adding one or more points to the nonlinear vector graph 118. The edit module 214 is operable to update $\mathcal{O}$, the set of contours 210, responsive to the addition of points 204 or primitives 206 to the nonlinear vector graph 118.

By way of example, consider FIG. 5a which depicts an example 500a of an edit 216 including an operation to add line primitives and points to a nonlinear vector graph 118 in a first stage 502 and a second stage 504. The first stage 502 depicts a geometric realization of a nonlinear vector graph 118, e.g., the nonlinear vector graph 118 as depicted in FIG. 3a. Progressing to the second stage 504, three points 506a, 506b, and 506c have been added to the nonlinear vector graph 118. Three line primitives 508a, 508b, and 508c have also been added to the nonlinear vector graph 118. In this example, the three points 506a, 506b, and 506c are added automatically and without user intervention responsive to a user operation to add the line primitives 508a, 508b, and 508c.

FIG. 5b depicts an example 500b of a JSON representation of the addition operation as illustrated in FIG. 5a. In the JSON representation, the points 506a, 506b, and 506c are added, as well as the line primitives 508a, 508b, and 508c. The addition of the points 506a, 506b, and 506c and line primitives 508a, 508b, and 508c results in fragmentation of the existing circular arc primitives. The edit module 214 modifies the existing circular arc primitives "a0", "a1", and "a2" and automatically adds three circular arc primitives "a3", "a4", and "a5" as shown at 510. Further, the edit module 214 is operable to automatically calculate updated contours 210 based on the edited nonlinear vector graph 118, as shown at 512 of FIG. 5b. Thus, points and lines are added to the nonlinear vector graph 118 without a holistic reordering to the representation, which increases computational efficiency and overcomes conventional limitations.

The edit module 214 is further operable to delete one or more points 204 or primitives 206 from the nonlinear vector graph 118 without necessitating a reordering to the nonlinear vector graph 118. Consider an example in which "v" represents a point from the plurality of points 204 to be deleted from the nonlinear vector graph 118. Where there are no incident edges on the vertex v, the edit 216 includes simply removing v from Ω. In another example, the vertex v has two incident edges $\rho_1$ and $\rho_2$, such that there exists a primitive $\rho = \rho_1 \circ \rho_2$. To perform the deletion, the edit module 214 is operable to replace $\rho_1$ and $\rho_2$ with ρ in $\mathcal{T}$, and remove v from Ω. In other words, the edit module 214 merges $\rho_1$ and $\rho_2$ to create ρ.

In an example to remove a primitive 206 from the nonlinear vector graph 118, the edit module 214 is employed to remove the primitive ρ from $\mathcal{T}$. Further, the edit module 214 is employed to remove points ρ from Ω according to the above-described techniques for removing a point v. In both instances, the removal of points 204 and/or primitives 206 from the nonlinear vector graph 118 updates the contour set $\mathcal{O}$.

In some examples, the edit module 214 is employed to join a first nonlinear vector graph 118 with one or more other nonlinear vector graphs 118. For instance, the plurality of points 204 and primitives 206 of the nonlinear vector graph 118 are merged with points 204 and primitives 206 of a second nonlinear vector graph 118. By way of example, given two nonlinear vector graphs $\mathcal{G}_0$ and $\mathcal{G}_1$, the edit module 214 is operable to define a subsequent nonlinear vector graph $\mathcal{G}_J$ that combines two paths defined by $\mathcal{G}_0$ and $\mathcal{G}_1$ into one path. The edit module 214 does so by merging the points 204 and primitives 206 from one path into the other path, i.e., $\Omega_J = \Omega_1 \cup \Omega_2$ and $\mathcal{G}_J = \mathcal{G}_1 \cup \mathcal{G}_2$. Using the subsequent nonlinear vector graph 118, the edit module 214 computes the contour set for $\mathcal{G}_J$.

In other examples, the edit module 214 is operable to split the nonlinear vector graph 118 into two or more resulting nonlinear vector graphs 118. For instance, the edit module 214 splits the nonlinear vector graph $\mathcal{G}$ into two graphs $\mathcal{G}_0 := (\Omega_0, \mathcal{T}_0)$ and $\mathcal{G}_1 := (\Omega_1, \mathcal{T}_1)$, where $\Omega_0 \cap \Omega_1 = \emptyset$ and $\mathcal{T}_0 \cap \mathcal{T}_1 = \emptyset$. The edit module 214 then computes sets of contours 210 for $\mathcal{G}_0$ and $\mathcal{G}_1$ respectively. Because the points 204 and primitives 206 of the nonlinear vector graph 118 are explicitly indexed, e.g., with a respective unique identifier as described above, such edits 216 (e.g., add points 204 or primitives 206, remove points 204 or primitives 206, join operations, split operations) are made without a holistic reordering to the representation as in conventional approaches, thus increasing user and computational efficiency.

Further, implementation of contours 210 as part of the nonlinear vector graph 118 to define edges and/or faces of a vector object 122 supports simplified functionality related to application of an edit 216 including visual edits to the vector object 122. For instance, leveraging contours 210 supports fill and stroke operations to edit the vector object 122 as a whole or to selectively edit different regions of the same path. Definition of faces and edges using contours 210 further facilitates efficient geometric edits to the vector object 122, e.g., to "drag and drop" portions of the vector object 122 to change the shape, size, orientation, alignment, etc. of the vector object 122.

In an example, the nonlinear vector graph 118 includes at least one contour 210 defining a face of the vector object 122 and applying the edit 216 to the nonlinear vector graph 118 includes a fill operation to apply a visual effect to pixels of the face, e.g., to control the color, gradient, style, pattern, etc. of the face. The edit module 214 is operable to apply the fill operation to apply color to pixels enclosed by one or more closed contours 210. For a closed contour $o \in \mathcal{O}$, $I_o$ denotes a region ($\subseteq \mathbb{R}^2$) enclosed by o. In an example in which the fill operation includes controlling the color of the face, the edit module 214 applies the fill operation, such that $fill_o:I_o \rightarrow C$, where C is the color source, which gives color to pixels inside the contour 210.

Generally, an edit 216 to apply a fill operation is performed on a closed contour 210. Accordingly, the edit module 214 is operable to implement an Euler circuit to determine closed contours 210, i.e., contours 210 that are fillable. The Euler circuit represents a "walk" in which edges of the nonlinear vector graph 118 are "visited" once. If the nonlinear vector graph 118 supports an Euler circuit, then the Euler circuit defines a closed contour 210 which enables the fill operation as included in the edit 216. In one or more examples, the edit module 214 detects whether a nonlinear vector graph 118 supports an Euler circuit by ascertaining whether each point of the plurality of points 204 has an even numbered out-degree. The edit module 214 defines the Euler circuit where the nonlinear vector graph 118 is open and has two points with an out-degree of one. The edit module 214 thus defines a closed contour 210 formed by joining a start and end point as determined by the Euler circuit.

In a further example, the edit module 214 is operable to determine closed contours 210 using a minimal cycle decomposition. For instance, the edit module 214 employs the minimal cycle decomposition to define a set of contours 210, and subsequently applies a visual edit 216 to the vector object 122 using the set of contours 210. In another example, the edit module 214 computes a planar arrangement, e.g., to generate a plurality of non-overlapping faces. Thus, the edit module 214 is able to apply individual visual effects to the respective non-overlapping faces. For instance, the edit module 214 computes the planar arrangement to separately color individual faces of a vector object 122.

To compute the planar arrangement, the edit module 214 determines the intersections of primitives 206 included in the nonlinear vector graph 118. The edit module 214 then stores the intersections as added points 204 as part of the nonlinear vector graph 118. Doing so fragments existing primitives 206, and the edit module 214 automatically stores the added and modified primitives 206 as part of the nonlinear vector graph 118 in accordance with the techniques described above. The edit module 214 is then operable to determine contours 210 to define a plurality of nonintersecting faces of the vector object 122. Thus, the edit module 214, through implementation of the planar arrangement, is able to individually apply a visual effect to the plurality of non-overlapping faces as defined by contours 210, e.g., apply different colors to different faces which is not possible using conventional techniques.

In an alternative or additional example, the nonlinear vector graph 118 includes at least one contour 210 defining an edge of the vector object 122 and applying the edit 216 to the nonlinear vector graph 118 includes applying a visual effect to the edge as a stroke operation, e.g., to change the color, size, style, etc. of the edge. In this example, the stroke region is defined by a stroke parameter function w that defines the edit 216, e.g., stroke width, stroke style, stroke size, etc. $I_{w,o}$ represents the area covered by the stroke as determined by the given stroke parameters. The stroke operation including the stroke parameter w is thus defined as $stroke_{w,o}:I_{w,o} \rightarrow C$.

In another example, the edit module 214 is operable to utilize a planar arrangement to apply a stroke to an edge, e.g., as calculated above. The edit module 214 is operable to determine intersection points and end points of the primitives 206 of the nonlinear vector graph 118 and apply a visual edit 216 to the edges that connect the intersection points and end points. In this way, the edit module 214 is operable to efficiently apply visual edits to the edges of the vector object 122 as a whole, or individually edit portions of the vector object, e.g., on an edge-by-edge basis. Thus, the edit module 214 is operable to apply multiple strokes in different regions of the same path.

Accordingly, the edit module 214 is able to apply an extensive variety of edits 216 to the nonlinear vector graph to generate the edited vector object 218. Once generated, the edited vector object 218 is output for display, for instance in the user interface 110 (block 1006). Thus, use of the nonlinear vector graph 118 as a representation for vector objects 122 provides a robust and intuitive modality to support vector graphics editing workflows.

Consider a first, second, and third example 602, 604, and 606 illustrated in FIG. 6, in which an edit is applied to the nonlinear vector graph 118 to generate an edited vector object 218. In the first example 602, the edit module 214 receives an input specifying an edit to the vector object 122. In this example, the vector object 122 is generated based on the nonlinear vector graph depicted in FIGS. 3a and 3b. The edit 216 includes a fill operation, in this instance to apply different visual effects to different faces of the vector object 122. For instance, the edit module 214 applies a solid fill to faces 608a, 608b, 608c, and 608d as defined by contours 210 in the nonlinear vector graph 118. The edit module 214 also applies a patterned fill to a face 610, and a face 612 is left unfilled. The edited vector object 218 is then output for display in the user interface 110.

In the second example 604, the edit module 214 receives an input specifying an edit 216 to the vector object 122. The edit 216 includes a stroke operation, in this instance to apply a dashed stroke to the edges of the vector object 122. The edit module 214 identifies the edges as defined by contours 210 as part of the nonlinear vector graph 118 and applies the stroke operation to the edges. Accordingly, the edited vector object 218 is output for display in the user interface 110 with dashed edges. While in this example the visual effect is applied to the vector object 122 as a whole, this is by way of example and in other examples visual effects are applied to individual edges of the edited vector object 218, e.g., different strokes in different regions of a same path.

In the third example 606, the edit 216 includes a visual edit to apply a stroke operation, a fill operation, and several geometric edits to alter the shape of the vector object 122. The edit module 214 applies the stroke operation to edit the color of the edges and applies the fill operation to apply a solid fill to the faces of the vector object 122 as described above. Further, in this example the edit module 214 receives an input specifying an edit 216 to the vector object 122 that includes a user input to "drag" vertices of the vector object 122 to alter its shape. The edited vector object 218 is generated by applying the edit 216 to nonlinear vector graph 118, e.g., by altering a location of one or more of the plurality of points 204, changing characteristics of several primitives 206, and editing the structure of the nonlinear vector graph 118.

Notably, in this example the edit 216 includes altering a location of a junction 614, e.g., where four primitives 206 of the nonlinear vector graph 118 meet. Because the nonlinear vector graph 118 is order independent and capable of representing junctions with a single path, the edit module 214 implements the edit 216 to move the junction without introducing artifacts and further without necessitating a reordering to the underlying representation. For instance, the edit module 214 automatically changes characteristics of the primitives 206 connected at the junction 614. The resulting edited vector object 218 is displayed in the user interface 110. Thus, use of the nonlinear vector graph 118 to represent vector objects enables intuitive and extensive editing capabilities, while improving user and computational efficiency.

Interoperability of the Nonlinear Vector Graph

The representation module 116 further includes a conversion module 220 to support interoperability of the nonlinear vector graph 118, i.e., to cause a conversion between types of representations. In an example, this includes conversion from the nonlinear vector graph 118 to an alternative representation for a vector object 122, e.g., a PDF and/or SVG representation. The conversion module 220 is further operable to receive, as input, an alternative vector object representation, e.g., PDF or SVG, and generate a nonlinear vector graph 118.

In some instances, conversion to an alternative representation is desirable, e.g., to support varied workflows in collaborative environments. Consider, for example, a scenario in which multiple individuals are collaborating on a graphic design including a vector object 122, and one participant is utilizing an outdated device that does not support or recognize representations using nonlinear vector graph 118 but does support PDF. Accordingly, the conversion module 220 is operable to transform the at least one primitive 206 of the nonlinear vector graph 118 to one or more paths of an alternative vector object representation, e.g., one or more paths of a portable document format object. To transform the nonlinear vector graph 118 to a PDF representation, the conversion module 220 is operable to traverse the contours 210 of the nonlinear vector graph 118 and convert the primitives 206 to Bezier segments or straight lines. Because conventional representations are limited to depicting shapes as straight lines or cubic Beziers, other types of primitives of the nonlinear vector graph 118, (e.g., circular arcs, conics, clothoids, etc.) are approximated to either a straight line or cubic Bezier.

Further, conversion from conventional representations, e.g., PDF or SVG, to the nonlinear vector graph 118 is desirable to support the varied editing operations as described above, to preserve computational resources, and support co-editing workflows that don't require a holistic reordering to the representation. Accordingly, the conversion module 220 is operable to receive as input an alternative representation, for instance a PDF representation for a vector object 122. To construct the nonlinear vector graph 118, the conversion module 220 is operable to convert paths from the PDF representation directly to one or more contours 210 of the nonlinear vector graph 118. Accordingly, the edit module 214 is able to perform edits on the converted representation as described above. In this way, conversion of the nonlinear vector graph 118 supports flexibility and adaptability in the design process.

Nonlinear Vector Object Improvements

FIG. 7 depicts an example 700 of a practical application of the techniques described herein compared to conventional representations for vector objects in a first and a second example 702 and 704. In the first example 702, a circular vector object 122 based on a conventional representation, e.g., PDF or SVG, is illustrated. Because the conventional representation is limited to approximation of vector objects using straight lines or cubic Beziers, the circle is approximated by four cubic Bezier curves. Imprecisions based on this approximation are evident when the vector object 122 is manipulated. For instance, rotation of the circle results in inadvertent changes to the height and width of the circle as shown in the dashed circle at 706. Accordingly, conventional representations for vector objects are prone to inaccuracies based on imperfect approximations.

However, as illustrated in the second example 704, a circular vector object 122 is generated based on a nonlinear vector graph 118. The nonlinear vector graph 118 supports an expanded set of primitives 206, such as line primitives, cubic Bezier primitives, circular arc primitives, conic primitives, circular primitives, clothoid primitives, junction primitives, etc. In this example the nonlinear vector graph 118 includes a circular primitive to represent the vector object 122. Accordingly, when an edit is applied to rotate the circle, e.g., by the edit module 214, dimensions of the circle are preserved without the inaccuracies present in conventional techniques.

FIG. 8 depicts an additional example 800 of a practical application of the techniques described herein compared to conventional representations for vector objects in a first and second example 802 and 804. For instance, the first example 802 illustrates a conventional representation for a vector object 122 where three segments meet at one point, i.e., a junction. Because conventional representations rely on vector paths that are defined as a linear sequence of segments, multiple paths are created to represent the junction. Accordingly, this leads to complications when creating and editing, as well as visual artifacts such as transparency blending, as depicted within the dashed circle at 806. As illustrated, the intersection point of the multiple paths is a darker color because of the multiple overlapping paths. Thus, representing vector objects using conventional techniques reduces the visual quality of the vector object and hinders device operation.

However, as illustrated in the second example 804, a vector object 122 is represented using a nonlinear vector graph 118. Because the nonlinear vector graph 118 leverages explicit indexing, rather than a linear sequence of segments, the nonlinear vector graph 118 is able to accurately represent a junction without visual artifacts, e.g., transparency blending. Further, in some examples the primitives 206 include one of more junction primitives to represent the junction to reduce the incidence of visual artifacts. Accordingly, the vector object 122 in the second example 804 is illustrated without the visual artifact seem in the first example 802. In this way, a representation based on the nonlinear vector graph 118 is able to overcome the limitations of conventional techniques.

Example System and Device

Figure 11:
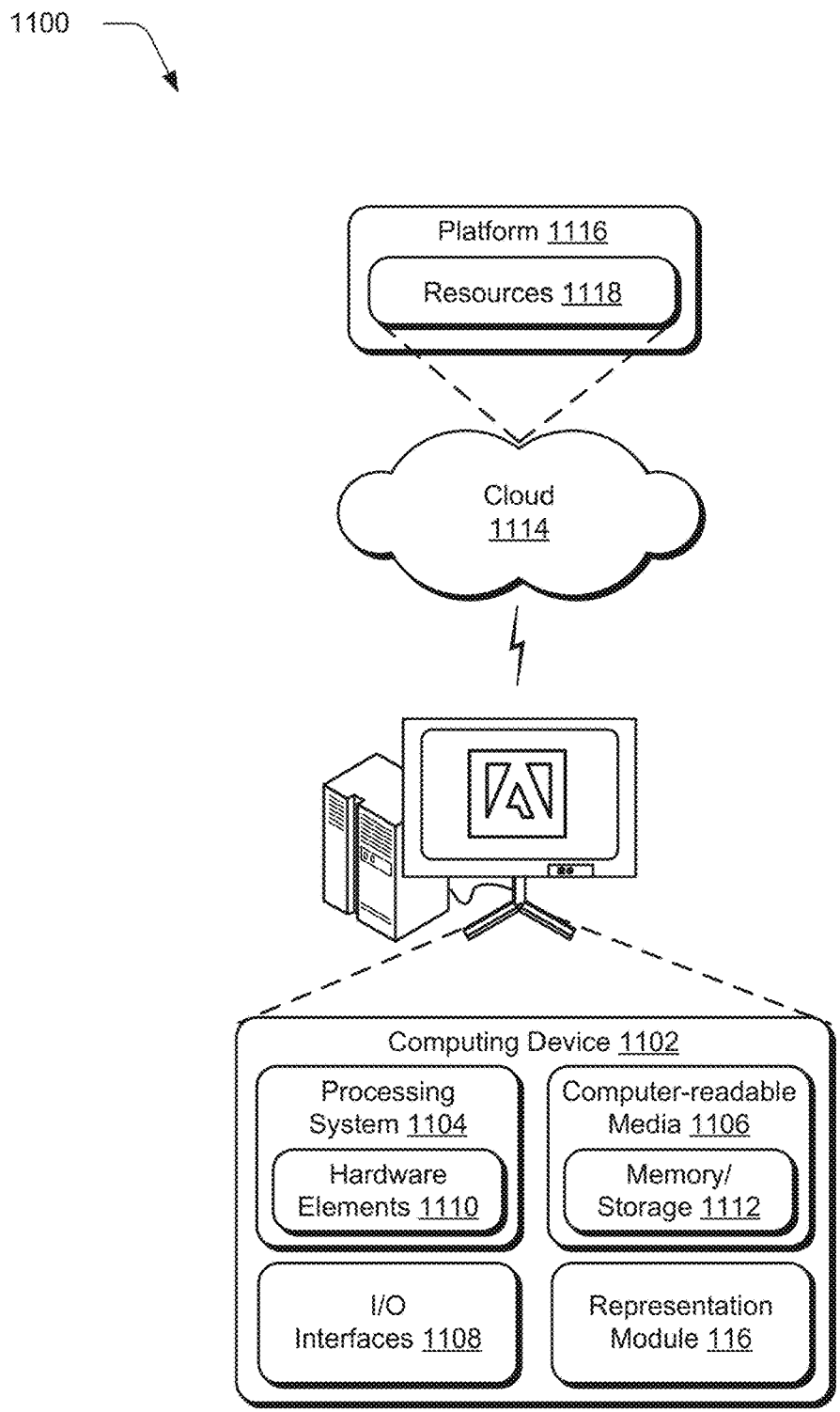
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the representation module 116. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
receiving, by a processing device, an input including a plurality of points and at least one primitive in a user interface;
generating, by the processing device, a vector object by constructing a nonlinear vector graph, the nonlinear vector graph specifying a nonlinear connection of the plurality of points with the at least one primitive; and
outputting, by the processing device, the vector object for display in the user interface.

2. The method as described in claim 1, wherein the nonlinear vector graph includes one or more contours, the one or more contours representing a non-intersecting connected ordering of two or more primitives.

3. The method as described in claim 2, wherein the one or more contours define at least one face of the vector object or at least one edge of the vector object.

4. The method as described in claim 1, wherein the nonlinear vector graph includes one or more constraints that define a relationship between two or more primitives.

5. The method as described in claim 4, wherein the one or more constraints include at least one of a continuity constraint, a parallel constraint, or a concentric constraint.

6. The method as described in claim 1, wherein the at least one primitive includes a circular arc primitive, the circular arc primitive defined by three control points from the plurality of points and a spin value signifying a directionality of sweep for the circular arc primitive.

7. The method as described in claim 1, wherein the at least one primitive includes at least one of a circular primitive, a conic primitive, or a clothoid primitive.

8. The method as described in claim 1, further comprising transforming the at least one primitive of the nonlinear vector graph to one or more paths of a portable document format vector object.

9. The method as described in claim 1, further comprising receiving as input a portable document format vector object and wherein constructing the nonlinear vector graph includes converting paths from the portable document format vector object to one or more contours of the nonlinear vector graph.

10. A non-transitory computer-readable storage medium storing executable instructions, which when executed by a processing device, cause the processing device to perform operations comprising:
receiving an input via a user interface, the input specifying an edit to a vector object;
generating an edited vector object by applying the edit to a nonlinear vector graph that defines the vector object, the nonlinear vector graph specifying a nonlinear connection of a plurality of points and at least one primitive; and
outputting the edited vector object for display in the user interface.

11. The non-transitory computer-readable storage medium as described in claim 10, wherein the applying the edit to the nonlinear vector graph includes one or more of editing a structure of the nonlinear vector graph, changing a characteristic of the at least one primitive, or altering a location of one or more points of the plurality of points.

12. The non-transitory computer-readable storage medium as described in claim 10, wherein the applying the edit to the nonlinear vector graph includes one or more of adding a point to a primitive, adding a primitive to the nonlinear vector graph, deleting a point from the nonlinear vector graph, or deleting a primitive from the nonlinear vector graph.

13. The non-transitory computer-readable storage medium as described in claim 10, wherein the nonlinear vector graph includes at least one contour defining a face of the vector object, and wherein the applying the edit to the nonlinear vector graph includes a fill operation to apply a visual effect to pixels of the face.

14. The non-transitory computer-readable storage medium as described in claim 10, wherein the applying the edit to the nonlinear vector graph includes generating a plurality of non-overlapping faces by computing a planar arrangement and individually applying a visual effect to the plurality of non-overlapping faces.

15. The non-transitory computer-readable storage medium as described in claim 10, wherein the nonlinear vector graph includes at least one contour defining an edge of the vector object and wherein the applying the edit to the nonlinear vector graph includes applying a visual effect to the edge as a stroke operation.

16. The non-transitory computer-readable storage medium as described in claim 10, wherein the applying the edit to the nonlinear vector graph includes joining the nonlinear vector graph with a second nonlinear vector graph.

17. The non-transitory computer-readable storage medium as described in claim 10, wherein the applying the edit to the nonlinear vector graph includes splitting the nonlinear vector graph into two or more resulting nonlinear vector graphs.

18. A system comprising:
a representation module implemented by one or more processing devices to:
receive an input including a plurality of points and a plurality of primitives in a user interface;
generate a vector object by constructing a nonlinear vector graph, the nonlinear vector graph including at least one point of the plurality of points defining a junction joining at least three primitives of the plurality of primitives, one to another; and
output the vector object for display in the user interface.

19. The system as described in claim 18, wherein each point of the plurality of points and the plurality of primitives are associated with a respective identifier.

20. The system as described in claim 18, wherein one or more of the at least three primitives of the junction includes a circular arc primitive, a circular primitive, a conic primitive, or a clothoid primitive.

* * * * *